US011485922B2

(12) United States Patent
Kadlecek et al.

(10) Patent No.: US 11,485,922 B2
(45) Date of Patent: Nov. 1, 2022

(54) HIGH NAPTHENIC CONTENT KEROSENE COMPOSITIONS

(71) Applicant: ExxonMobil Technology and Engineering Company, Annandale, NJ (US)

(72) Inventors: Daniel E. Kadlecek, Philadelphia, PA (US); Randolph J. Smiley, Hellertown, PA (US); Gregory K. Lilik, Media, PA (US); Mike T. Noorman, Doylestown, PA (US); Shifang Luo, Annandale, NJ (US); Ian J. Laurenzi, Hampton, NJ (US); Poturovic Jasmina, Spring, TX (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 17/325,929

(22) Filed: May 20, 2021

(65) Prior Publication Data
US 2021/0363448 A1 Nov. 25, 2021

Related U.S. Application Data

(60) Provisional application No. 63/028,709, filed on May 22, 2020.

(51) Int. Cl.
*C10L 1/08* (2006.01)
*C10G 53/02* (2006.01)
(Continued)

(52) U.S. Cl.
CPC .................. *C10L 1/08* (2013.01); *C10G 7/00* (2013.01); *C10G 53/02* (2013.01); *C10G 53/10* (2013.01);
(Continued)

(58) Field of Classification Search
CPC .... C10L 1/08; C10L 2270/04; C10L 2290/24; C10L 2290/543; C10L 2290/544;
(Continued)

(56) References Cited

U.S. PATENT DOCUMENTS

| 3,985,638 A | * | 10/1976 | Kirk, Jr. | ................... C10L 1/04 208/57 |
| 10,316,263 B2 | | 6/2019 | Rubin-Pitel et al. | |

(Continued)

OTHER PUBLICATIONS

International Search Report and Written Opinion PCT/US2021/033561 dated Sep. 20, 2021.
(Continued)

*Primary Examiner* — Ali Z Fadhel
(74) *Attorney, Agent, or Firm* — Shook Hardy & Bacon L.L.P.

(57) ABSTRACT

Kerosene boiling range or jet fuel boiling range compositions are provided that are formed from crude oils with unexpected combinations of high naphthenes to aromatics weight and/or volume ratio and a low sulfur content. The resulting kerosene boiling range fractions can have an unexpected combination of a high naphthenes to aromatics weight ratio, a low but substantial aromatics content, and a low sulfur content. Such fractions can potentially be used as fuel after a reduced or minimized amount of additional refinery processing. By reducing, minimizing, or avoiding the amount of refinery processing needed to meet fuel and/or fuel blending product specifications, the fractions derived from the high naphthenes to aromatics ratio and low sulfur crudes can provide fuels and/or fuel blending products having a reduced or minimized carbon intensity.

18 Claims, 3 Drawing Sheets

(51) Int. Cl.
*C10G 53/10* (2006.01)
*C10G 7/00* (2006.01)

(52) U.S. Cl.
CPC ........... *C10G 2300/1011* (2013.01); *C10G 2300/1051* (2013.01); *C10G 2300/202* (2013.01); *C10G 2300/302* (2013.01); *C10G 2300/304* (2013.01); *C10G 2300/308* (2013.01); *C10G 2400/08* (2013.01); *C10L 2270/04* (2013.01); *C10L 2290/24* (2013.01); *C10L 2290/543* (2013.01); *C10L 2290/544* (2013.01)

(58) Field of Classification Search
CPC .. C10L 1/04; C10G 7/00; C10G 53/02; C10G 53/10; C10G 2300/1011; C10G 2300/1051; C10G 2300/202; C10G 2300/302; C10G 2300/304; C10G 2300/308; C10G 2400/08; C10G 17/00; C10G 25/003; C10G 27/00
See application file for complete search history.

(56) References Cited

U.S. PATENT DOCUMENTS

| | | |
|---|---|---|
| 2009/0013590 A1 | 1/2009 | Lamprecht et al. |
| 2012/0246999 A1 | 10/2012 | Stern et al. |
| 2012/0261308 A1* | 10/2012 | Klein ............... C10G 55/04 208/85 |
| 2017/0183575 A1 | 6/2017 | Rubin-Pitel et al. |
| 2018/0371343 A1* | 12/2018 | Rubin-Pitel ............ C10L 10/08 |

OTHER PUBLICATIONS

Ohmes et al., "Impact of Light Tight Oils on Distillate Hydrotreater Operation", Petroleum Technology Quarterly, May 2016, pp. 25-33.

* cited by examiner

| Property | Units | Kero 1 | Kero 2 | Kero 3 | Kero 4 | Kero 5 | Kero 6 | Kero 7 | Kero 8 | Kero 9 |
|---|---|---|---|---|---|---|---|---|---|---|
| Density at 15.6°C | g/ml | 0.8214 | 0.8151 | 0.8039 | 0.8154 | 0.8049 | 0.811 | 0.81 | 0.7962 | 0.8139 |
| API Gravity | - | 40.6 | 41.9 | 44.3 | 41.8 | 44.1 | 42.8 | 39.2 | 46.2 | 42.4 |
| Cloud Point | °C | -40 | -38 | -38 | -36 | -34 | -35 | -37 | -46 | -46 |
| Freeze Point | °C | -34.5 | -35.8 | -34.5 | -32.5 | -32.8 | -32.2 | -32.5 | -44.6 | -43.1 |
| Sulfur Content | mass% | 0.02 | 0.0868 | 0.005 | 0.0053 | 0.0047 | 0.0086 | 0.011 | 0.0065 | 0.0093 |
| Nitrogen Content | mg/kg | 5.9 | <5 | <5 | <5 | <5 | 3.9 | 4.1 | 1.6 | 1.3 |
| GC Distillation | | | | | | | | | | |
| Temperature, 10% off | °C | 196 | 194 | 193 | 196 | 196 | 201 | 197 | 175 | 184 |
| Temperature, 50% off | °C | 239 | 236 | 236 | 242 | 239 | 243 | 246 | 206 | 215 |
| Temperature, 90% off | °C | 284 | 282 | 281 | 287 | 286 | 289 | 287 | 250 | 251 |
| Composition | | | | | | | | | | |
| Paraffins | wt% | 38.3 | 41.4 | 54.3 | 43.9 | 51.9 | 41.0 | 32.1 | 53.3 | 43.7 |
| Total Naphthenes | wt% | 47.4 | 50.2 | 39.4 | 47.3 | 43.2 | 43.4 | 42.3 | 35.6 | 36.6 |
| Total Aromatics | wt% | 14.3 | 8.3 | 6.3 | 8.8 | 5.0 | 15.6 | 25.6 | 11.1 | 19.6 |

FIG. 3

HIGH NAPTHENIC CONTENT KEROSENE COMPOSITIONS

CROSS-REFERENCE TO RELATED APPLICATIONS

This application claims the benefit of U.S. Provisional application Ser. No. 63/028,709 filed May 22, 2020, which is herein incorporated by reference in its entirety, FIELD This disclosure relates to kerosene boiling compositions having high naphthenic content and low aromatic content, fuel compositions or fuel blending compositions made from kerosene boiling range compositions, and methods for forming such fuel compositions, BACKGROUND Regulations such as the Renewable Fuels Standard in the United States and Renewable Energy Directive in Europe aim to reduce the carbon intensity (CI) of transportation fuels, based on a Life Cycle Analysis. Among the transportation sectors is aviation, where sustainable aviation fuels (SAF) are one of the options for reducing CI. However, SAF produced from biological sources tend to have low availability attributed to the logistical challenges of biomass production and the high costs of upgrading biomass feedstocks to finished fuels or fuel blendstocks. As an alternative, a low carbon aviation fuel (LCAF) derived from petroleum sources may also provide the aviation sector with a viable option for reducing greenhouse gas emissions. Advantages for a LCAF fuel are high availability and low processing costs. There is clearly a need for a readily available, low cost, and low carbon intensity aviation fuel.

In addition to reducing greenhouse gas emissions, possible reductions in ground-level emissions from the aviation sector are also being evaluated, primarily criteria emissions associated with particulate matter and SOx. An aviation fuel that could deliver lower total greenhouse gas emissions while also lowering particulate matter and SOx criteria emissions would be attractive to the aviation sector.

An article titled "Impact of Light. Tight Oils on Distillate Hydrotreater Operation" in the May 2016 issue of Petroleum Technology Quarterly describes hydroprocessing of kerosene and diesel boiling range fractions derived from tight oils.

U.S. patent application Publication 2017/0183575 describes fuel compositions formed during hydroprocessing of deasphalted oils for lubricant production.

SUMMARY

In various aspects, a kerosene boiling range composition is provided. The kerosene boiling range composition includes a T10 distillation point of 205° C. or less, a final boiling point of 300° C. or less, a naphthenes to aromatics weight ratio of 3.2 or more, an aromatics content of 4.0 wt % to 18 wt %, and a sulfur content of 150 wpm or less.

Also provided is a kerosene boiling range product comprising: 1.0 wt % to 49 wt % of sustainable aviation fuel in accordance with ASTM D7566; and 51 wt % to 99 wt % of a kerosene boiling range composition, the kerosene boiling range composition comprising a T10 distillation point of 205° C. or less, a final boiling point of 300° C. or less, a naphthenes to aromatics weight ratio of 3.2 or more, an aromatics content of 4.0 wt % to 18 wt % and a sulfur content of 100 wppm or less.

Also provided is a method for forming a kerosene boiling range composition, comprising: fractionating a crude oil comprising a final boiling point of 550° C. or more to form at least a kerosene boiling range fraction, the crude oil comprising a naphthenes to aromatics volume ratio of 2.0 or more and a sulfur content of 0.2 wt % or less, the kerosene boiling range composition comprising a T10 distillation point of 205° C. or less, a final boiling point of 300° C. or less, a naphthenes to aromatics weight ratio of 3.2 or more, an aromatics content of 4.0 wt % to 18 wt %, and a sulfur content of 100 wppm or less.

Use of compositions including the kerosene boiling range composition are also provided.

BRIEF DESCRIPTION OF THE DRAWINGS

FIG. 3 shows compositional values and properties for various kerosene boiling range fractions.

DETAILED DESCRIPTION

Figure 1:
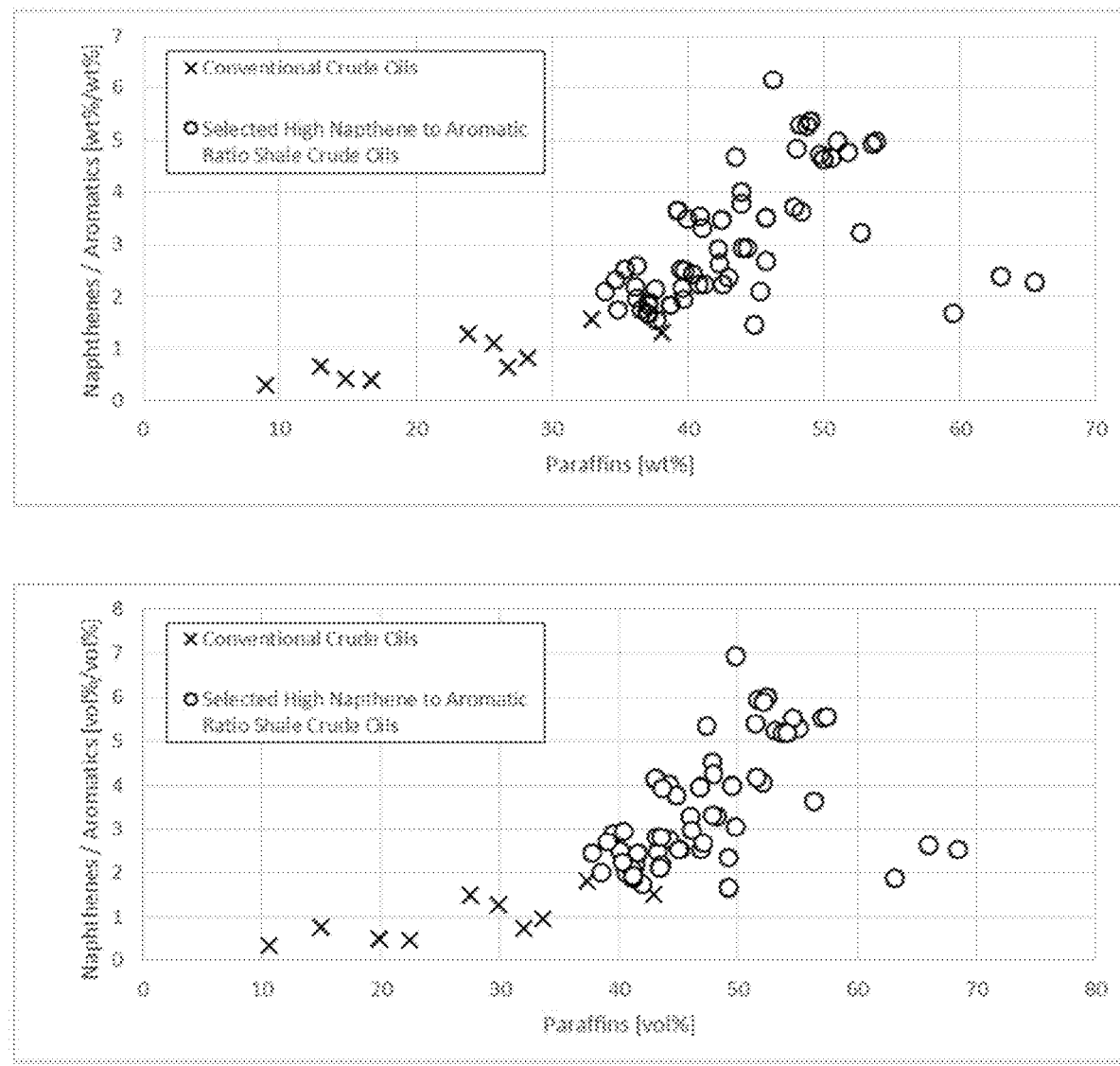
FIG. 1 shows compositional information for various crude oils.

In various aspects, kerosene boiling range or jet fuel boiling range compositions are provided that are formed from crude oils with unexpected combinations of high naphthenes to aromatics weight and/or volume ratio and a low sulfur content. This unexpected combination of properties is characteristic of crude oils that can be fractionated to form jet fuel boiling range and/or kerosene boiling range compositions that can be used as fuels/fuel blending products with minimal processing. The resulting kerosene boiling range fractions can have an unexpected combination of a high naphthenes to aromatics weight ratio, a low but substantial aromatics content, and a low sulfur content. In some aspects, the fractions can be used as fuels and/or fuel blending products after fractionation, optionally with additional processing such as clay treating. In such aspects, the fractions can be used as fuels and/or fuel blending products without exposing the fractions to hydroprocessing and/or other energy intensive refinery processes. By reducing, minimizing, or avoiding the amount of hydroprocessing and/or other refinery processing needed to meet fuel and/or fuel blending product specifications, the fractions derived from the high naphthenes to aromatics ratio and low sulfur crudes can provide fuels and/or fuel blending products having a reduced or minimized carbon intensity. In other words, due to this reduce or minimized processing, the net amount of $CO_2$ generation that is required to produce a fuel or fuel blending component and then use the resulting fuel can be reduced. The reduction in carbon intensity can be on the order of 1%-10% of the total carbon intensity for the fuel. This is an unexpected benefit, given the difficulty in achieving even small improvements in carbon intensity for conventional fuels and/or fuel blending products.

Generally, the naphthenes to aromatics weight ratio of the kerosene boiling range fractions described herein can be 1.9 or more, or 2.5 or more, or 3.0 or more, or 3.2 or more, or 3.5 or more, or 4.0 or more, such as up to 10 or possibly still higher. However, it is noted that, in various aspects, the high naphthenes to aromatics ratio is not due to an excessively low content of aromatics. For example, the kerosene boiling range or jet fuel boiling ramie) compositions can include 4.0 wt % to 27 wt % of aromatics, or 4.0 wt % to 18 wt %, or 4.0 wt % to 16 wt %, or 4.0 wt % to 12 wt %, or 4.0 wt % to 10 wt %. Instead, the kerosene boiling range compositions have unexpected combinations of high naphthenes to aromatics ratio while still including a minimum aromatics content. For example, in some aspects the compositions can include a naphthenes to aromatics weight ratio of 3.0 or more (or 3.5 or more) white having an aromatics content of 4.0 wt % to 12 wt %, or 4.0 wt % to 10 wt %. Additionally, the sulfur content of the kerosene boiling range composition can be 250 wppm or less, or 100 wppm or less, or 75 wppm or less, such as down to 1.0 wppm or possibly still lower. In terms of vol %, the kerosene boiling range (or jet fuel boiling range) compositions can include 4.0 vol % to 25 vol % aromatics, or 4.0 vol % to 17 vol %, or 4.0 vol % to 15 vol %, or 4.0 vol % to 12 vol %, or 4.0 vol % to 10 vol %. The corresponding naphthenes to aromatics volume ratio can be 1.9 or more, or 2.6 or more, or 3.0 or more, or 3.2 or more, or 3.5 or more, or 4.0 or more, such as up to 10 or possibly still higher Having a high naphthenes to aromatics ratio while still having a low but substantial aromatics content is unexpected due to the ring structures present in both naphthenes and aromatics. Conventionally, it would be expected that a crude fraction including a high ratio of naphthenes to aromatics would correspond to a) a hydrotreated composition, so that the high ratio of naphthenes was achieved by converting aromatic rings to saturated rings, b) a composition with a de minimis content of aromatics, or c) a combination of a) and b). Unfortunately, using hydroprocessing to arrive at a high ratio of naphthenes to aromatics results in increased carbon intensity for a fuel fraction.

With regard to aromatics content, lower aromatics content is generally beneficial for a kerosene fraction for a variety of reasons. A lower aromatics content, such as an aromatics content of 10 wt % or less, can reduce soot and or smoke production during combustion, it is generally desirable to have at least a few weight percent of aromatics in a jet fuel composition. When a kerosene is used as a jet fuel, a low aromatics content, such as an aromatics content of 10 wt % or less, can also reduce or minimize flame irradiation effects in turbine engine combustors. However, an aromatics content that is too close to 0 wt % can present difficulties. For example, the presence of aromatics assists with elastomer swell in jet fuel systems, and is also beneficial for providing a desirable density for a jet fuel, Thus, the unexpected combination of a high naphthenes to aromatics ratio while having a low but substantial aromatics content is beneficial for forming at least some types of fuels from a kerosene boiling range fraction. In combination with a low sulfur content, the unexpected combination of a high naphthenes to aromatics ratio and a low but substantial aromatics content can allow for formation of fuels or fuel blending components while reducing or minimizing refinery processing, resulting in a reduced or minimized carbon intensity for the fuel or fuel blending product.

A kerosene boiling; range fuel with a high ratio of naphthenes to aromatics and a low but substantial aromatics content can also provide other advantages. For example, typical kerosene boiling range fuels (such as jet fuels) can typically have a cetane index of less than 30, such as between 20 and 30. In various aspects, a kerosene boiling range fraction with a high ratio of naphthenes to aromatics and a low but substantial content of aromatics can have a cetane index of greater than 30. For example, a kerosene boiling range fraction can have a cetane index of 31-55, or 35-55, or 40-55, or 45-55. It is noted that a cetane index of 45 or more can be beneficial for light aircraft that operate using compression ignition engines.

In aspects where a kerosene fraction is not hydrotreated, a kerosene fraction with a sulfur content of 100 wppm or less can have an unexpectedly high ratio of aliphatic sulfur to total sulfur. Aliphatic sulfur is typically removed easily under hydrotreatment conditions, so a kerosene fraction that achieved a sulfur content of 100 wppm or less due to hydrotreatment can typically have a weight ratio of aliphatic sulfur to total sulfur of less than 0.02. In other words, aliphatic sulfur corresponds to less than 2 wt % of the total sulfur. By contrast, a kerosene fraction with a sulfur content of 150 wppm or less (or 100 wppm less) that has not been exposed to hydrotreating conditions can have a weight ratio of aliphatic sulfur to total sulfur of 0.05 or more, or 0.1 or more, such as up to 0.7 or possibly still higher. It is noted that the limit for aliphatic sulfur in some jet fuel products is 30 wppm or less. In some aspects, another indicator of a fraction that has not been hydroprocessed is that a kerosene fraction has a volume ratio of n-paraffins to total paraffins (n-paraffins plus isoparaffins) of 0.4 or more.

Still other properties, of a kerosene boiling range fraction having a high ratio of naphthenes to aromatics and a low but substantial aromatics content can include a Saybolt color rating of 25 or more; an interfacial tension rating of 35 dynes or higher; a cloud point of −40° C. or lower, such as down to −60° C.; a pour point of −40° C. or lower, such as down to −60° C.; freeze point of −40° C. or lower, or 47° C. or lower such as down to −60° C. or possibly still lower); and a smoke point of 22 mm or more.

In addition to having a reduced or minimized carbon intensity as a separate fuel fraction, a kerosene fraction having a high naphthenes to aromatics ratio and a low but substantial aromatics content can also be combined with one or more sustainable aviation fuel fractions, as defined in ASTM D7566, to form a fuel with a reduced carbon intensity. Such a blend has synergistic advantages, as blending a kerosene fraction as described herein with a bio-derived sustainable aviation fuel can allow for correction of the freeze point of the bio-derived sustainable aviation fuel while avoiding the need to add a higher carbon intensity fraction to the sustainable aviation fuel.

The lower carbon intensity of a fuel containing at least a portion of a kerosene fraction as described herein can be realized by using a fuel containing at least: a portion of such a kerosene fraction in any convenient type of combustion device. In some aspects, a fuel containing at least a portion of a kerosene fraction as described herein can be used as fuel for a combustion engine in an airplane, a wound transportation vehicle, a marine vessel, or another convenient type of vehicle. Still other types of combustion devices can include generators, furnaces, and other combustion devices that are used to provide heat or power.

Based on the unexpected combinations of compositional properties, the kerosene boiling range compositions can be used to produce fuels and/or fuel blending products that also generate reduced or minimized amounts of other undesired combustion products. The other undesired combustion products that can be reduced or minimized can include sulfur oxide compounds (SOx), nitrogen oxide compounds (NOx), and soot. The low sulfur oxide production is due to the unexpectedly low sulfur content of the compositions. The high naphthenes to aromatics ratio can allow for a cleaner burning fuel, resulting in less incomplete combustion that produces soot. The lower nitrogen oxide production can be due to a corresponding low nitrogen content that is also observed in these low carbon intensity compositions.

It has been discovered that selected shale crude oils are examples of crude oils having an unexpected combination of high naphthenes to aromatics ratio, a low but substantial content of aromatics, and a low sulfur content. In various aspects, a shale oil fraction can be included as part of a fuel or fuel blending product. Examples of shale oils that provide this unexpected combination of properties include selected shale oils extracted from the Permian basin. For convenience, unless otherwise specified, it is understood that references to incorporation of a shale oil fraction into a fuel also include incorporation of such a fraction into a fuel blending product.

Current commercial standards for jet fuels typically specify a variety of properties, Examples of property specifications and/or typical properties for commercial jet fuels include a total acidity of 0.1 mg KOH/g or less, or 0.015 mg KOH/g or less, a sulfur content of 3000 wppm or less, a freezing point maximum of −40° C. or −47° C., a viscosity at −20° C. of 8.0 cSt or less, a flash point of at least 38° C., an initial boiling point of 140° C. or more, a T10 distillation point of 205° C. or less, and/or a final boiling point of 300° C. or less. Another example of a property specification is a specification for a maximum deposit thickness on the surface of a heater tube and/or a maximum pressure increase during a thermal stability test at 260° C. (according to ASTM D3241), such as a maximum deposit thickness of 85 am and/or a maximum pressure increase of 25 mm Hg. Still another example of a property specification can be a water separation rating, such as a water separation rating of 85 or more, as measured according to ASTM D3948, A water separation rating provides an indication of the amount of surfactant present in a jet fuel boiling range sample. Petroleum fractions that have an appropriate boiling range and that also satisfy the various requirements for a commercial standard can be tested (such as according to ASTM D3241) and certified for use as jet fuels. In some aspects, the kerosene boiling range fraction can correspond to a jet fuel fraction that satisfies the specification for a jet fuel under ASTM D1655. This can include a thermal stability breakpoint of 260° C. or more, or 275° C. or more, as defined by ASTM D3241.

Definitions

All numerical values within the detailed description and the claims herein are modified by "about" or "approximately" the indicated value, and take into account experimental error and variations that would be expected by a person having ordinary skill in the art.

In this discussion, a shale crude oil is defined as a petroleum product with a final boiling point greater than 550° C. that is extracted from a shale petroleum source. A shale oil fraction is defined as a boiling range fraction derived from a shale crude oil.

Unless otherwise specified, distillation points and boiling points can be determined according to ASTM D2887. For samples that are not susceptible to characterization using ASTM D2887, D7169 can be used. It is noted that still other methods of boiling point characterization may be provided in the examples. The values generated by such other methods are believed to be indicative of the values that would be obtained under ASTM D2887 and/or D7169.

In this discussion, the jet fuel boiling, range or kerosene boiling range is defined as 140° C. to 300° C. A jet fuel boiling range fraction or a kerosene boiling range fraction is defined as a fraction with a T10 distillation point of 205° C. or less, and a final boiling point of 300° C. or less.

In this discussion, the distillate boiling range is defined as 170° C. to 566° C. A distillate boiling range fraction is defined as a fraction having a T10 distillation point of 170° C. or more and a T90 distillation point of 566° C. or less. The diesel boiling range is defined as 170° C. to 370° C. A diesel boiling range fraction is defined as a fraction having a T10 distillation point of 170° C. or more, a final boiling point of 300° C. or more, and a T90 distillation point of 370° C. or less. An atmospheric resid is defined as a bottoms fraction having a T10 distillation point of 149° C. or higher, or 350° C. or higher. A vacuum gas oil boiling range fraction (also referred to as a heavy distillate) can have a T10 distillation point of 350° C. or higher and a T90 distillation point of 535° C. or less. A vacuum resid is defined as a bottoms fraction having a T10 distillation point of 500° C. or higher, or 565° C. or higher. It is noted that the definitions for distillate boiling range fraction, kerosene (or, jet fuel) boiling range fraction, diesel boiling range fraction, atmospheric resid, and vacuum resid are based on boiling point only. Thus, a distillate boiling range fraction, kerosene fraction, or diesel fraction can include components that did not pass through a distillation tower or other separation stage based on boiling point A shale oil distillate boiling range fraction is defined as a shale oil fraction corresponding to the distillate boiling range. A shale oil kerosene (or, jet fuel) boiling range fraction is defined as a shale oil fraction corresponding to the kerosene boiling range. A shale oil diesel boiling range fraction is defined as a shale oil fraction corresponding to the diesel boiling range.

In some aspects, a shale oil fraction that is incorporated into a fuel or fuel blending product can correspond to a shale oil fraction that has not been hydroprocessed and/or that has not been cracked. In this discussion, a non-hydroprocessed fraction is defined as a fraction that has not been exposed to more than 10 psia of hydrogen in the presence of a catalyst comprising a Group VI metal, a Group VIII metal, a catalyst comprising a zeolitic framework, or a combination thereof. In this discussion, a non-cracked fraction is defined as a fraction that has not been exposed to a temperature of 400° C. or more.

In this discussion, a hydroprocessed fraction refers to a hydrocarbon fraction and/or hydrocarbonaceous fraction that has been exposed to a catalyst having hydroprocessing activity in the presence of 300 kPa-a or more of hydrogen at a temperature of 200° C. or more. Examples of hydroprocessed fractions include hydroprocessed distillate fractions (i.e., a hydroprocessed fraction having the distillate boiling range), hydroprocessed kerosene fractions a hydroprocessed fraction having the kerosene boiling range) and hydroprocessed diesel fractions (i.e., a hydroprocessed fraction having the diesel boiling range). It is noted that a hydroprocessed fraction derived from a biological source, such as hydrotreated vegetable oil, can correspond to a hydroprocessed distillate fraction, a hydroprocessed kerosene fraction, and/or a hydroprocessed diesel fraction, depending on the boiling range of the hydroprocessed fraction.

With regard to characterizing properties of kerosene boiling range fractions and/or blends of such fractions with other components to form kerosene boiling range fuels, a variety of methods can be used. Density of a blend at 15° C. (kg/m$^3$) can be determined according ASTM D4052, Sulfur (in wppm or wt %) can be determined according to ASTM D2622, while nitrogen (in wppm or wt %) can be determined according to D4629. Kinematic viscosity at either −20° C. or −40° C. (in cSt) can be determined according to ASTM D445. Pour point can be determined according to ASTM D5949. Cloud point can be determined according to D5773. Freeze point can be determined according to 05972.

With regard to determining paraffin, naphthene, and aromatics contents, supercritical fluid chromatography (SFC) was used. The characterization was performed using a commercial supercritical fluid chromatograph system, and the methodology represents an expansion on the methodology described in ASTM D5186 to allow for separate characterization of paraffins and naphthenes. The expansion on the ASTM D5186 methodology was enabled by using additional separation columns, to allow for resolution of naphthenes and paraffins. The system was equipped with the following components: a high pressure pump for delivery of supercritical carbon dioxide mobile phase; temperature controlled column oven; auto-sampler with high pressure liquid injection valve for delivery of sample material into mobile phase; flame ionization detector mobile phase splitter (low dead volume tee); back pressure regulator to keep the $CO_2$ in supercritical state; and a computer and data system for control of components and recording of data signal. For analysis, approximately 75 milligrams of sample was diluted in 2 milliliters of toluene and loaded in standard septum cap autosampler vials. The sample was introduced based via the high pressure sampling valve. The SFC separation was performed using multiple commercial silica packed columns (5 micron with either 60 or 30 angstrom pores) connected in series (250 mm in length either 2 mm or 4 mm ID). Column temperature was held typically at 35 or 40° C. For analysis, the head pressure of columns was typically 250 bar. Liquid $CO_2$ flow rates were typically 0.3 ml/minute for 2 mm ID columns or 2.0 mi/minute for 4 mm ID columns. The SFC FED signal was integrated into paraffin and naphthenic regions. In addition to characterizing aromatics according to ASTM D5186, a supercritical fluid chromatograph \vas used to analyze samples for split of total paraffins and total naphthenes. A variety of standards employing typical molecular types can be used to calibrate the paraffin/naphthene split for quantification.

In this discussion, the term "paraffin" refers to a saturated hydrocarbon chain, Thus, a paraffin is an alkane that does not include a ring structure. The paraffin may be straight-chain or branched-chain and is considered to be a non-ring compound, "Paraffin" is intended to embrace all structural isomeric forms of paraffins.

In this discussion, the term "naphthene" refers to a cycloalkane (also known as a cycloparaffin), Therefore, naphthenes correspond to saturated ring structures. The term naphthene encompasses single-ring naphthenes and multi-ring naphthenes. The multi-ring naphthenes may have two or more rings, e.g., two-rings, three-rings, four-rings, five-rings, six-rings, seven-rings, eight-rings, nine-rings, and ten-rings. The rings may be fused and/or bridged. The naphthene can also include various side chains, such as one or more alkyl side chains of 1-10 carbons.

In this discussion, the term "saturates" refers to all straight chain, branched, and cyclic paraffins. Thus, saturates correspond to a combination of paraffins and naphthenes.

In this discussion, the term "aromatic ring" means five or six atoms joined in a ring structure wherein (i) at least four of the atoms joined in the ring structure are carbon atoms and (ii) all of the carbon atoms joined in the ring structure are aromatic carbon atoms. Therefore, aromatic rings correspond to unsaturated ring structures. Aromatic carbons can be identified using, for example, Nuclear Magnetic Resonance. Aromatic rings having atoms attached to the ring (e.g., one or more heteroatoms, one or more carbon atoms, etc.) but which are not part of the ring structure are within the scope of the term "aromatic ring." Additionally, it is noted that ring structures that include one or more heteroatoms (such as sulfur, nitrogen, or oxygen) can correspond to an "aromatic ring" if the ring structure otherwise hills within the definition of an "aromatic ring".

In this discussion, the term "non-aromatic ring" means four or more carbon atoms joined in at least one ring structure wherein at least one of the four or more carbon atoms in the ring structure is not an aromatic carbon atom. Non-aromatic rings having atoms attached to the ring (e.g., one or more heteroatoms, one or more carbon atoms, etc.), but which are not part of the ring structure, are within the scope of the term "non-aromatic ring."

In this discussion, the term "aromatics" refers to all compounds that include at least one aromatic ring. Such compounds that include at least one aromatic ring include compounds that have one or more hydrocarbon substituents, ft is noted that a compound including at least one aromatic ring and at least one non-aromatic ring falls within the definition of the term "aromatics".

It is noted that that some hydrocarbons present within a feed or product may fall outside of the definitions for paraffins, naphthenes, and aromatics. For example, any alkenes that are not part of an aromatic compound would fall outside of the above definitions. Similarly, non-aromatic compounds that include a heteroatom, such as sulfur, oxygen, or nitrogen, are not included in the definition of paraffins or naphthenes.

Life Cycle Assessment and Carbon Intensity

Life cycle assessment (LCA) is a method of quantifying the "comprehensive" environmental impacts of manufactured products, including: fuel products, from "cradle to grave". Environmental impacts may include greenhouse gas (GHG) emissions, freshwater impacts, or other impacts on the environment associated with the finished product. The general guidelines for LCA are specified in ISO 14040.

The "carbon intensity" of a fuel product (e.g. kerosene fuel or jet fuel) is defined as the life cycle GHG emissions associated with that product (kg $CO_2$eq) relative to the energy content of that fuel product (MJ, LHV basis), Life cycle GHG emissions associated with fuel products must include GHG emissions associated with crude oil production; crude oil transportation to a refinery; refining of the crude oil; transportation of the refined product to point of "fill"; and combustion of the fuel product.

GHG emissions associated with the stages of refined product life cycles are assessed as follows.

(1) GHG emissions associated with drilling and well completion—including hydraulic fracturing, shall be normalized with respect to the expected ultimate recovery of sales-quality crude oil from the well.

(2) All GHG emissions associated with the production of oil and associated gas, including those associated with (a) operation of artificial lift devices, (b) separation of oil, gas, and water, (c) crude oil stabilization and/or upgrading, among other GHG emissions sources shall be normalized with respect to the volume of oil transferred to sales (e.g. to crude oil pipelines or rail). The fractions of GHG emissions associated with production equipment to be allocated to crude oil, natural gas, and other hydrocarbon products (e.g. natural gas liquids) shall be specified accordance with ISO 14040.

(3) GHQ emissions associated with rail, pipeline or other forms of transportation between the production site(s) to the refinery shall be normalized with respect to the volume of crude oil transferred to the refinery.

(4) 0140 emissions associated with the refining of crude oil to make liquefied petroleum gas, gasoline, distillate fuels and other products shall be assessed, explicitly accounting for the material flows within the refinery. These emissions shall be normalized with respect to the volume of crude oil refined.

(5) All of the preceding GHG emissions shall be summed to obtain the "Well to refinery" (WTR) GI-10 intensity of crude oil (e.g. kg $CO_2$eq/bbl crude).

(6) For each refined product, the WTR GHG emissions shall be divided by the product yield (barrels of refined product/barrels of crude), and then multiplied by the share of refinery GHG specific to that refined product. The allocation procedure shall be conducted in accordance with ISO I4040. This procedure yields the WTR GHG intensity of each refined product (e.g. kg $CO_2$eq/bbl kerosene).

(7) GHG emissions associated with rail, pipeline or other forms of transportation between the refinery and point of fueling shall be normalized with respect to the volume of each refined product sold. The sum of the GHG emissions associated with this step and the previous step of this procedure is denoted the "Well to tank" (WTT) GHG intensity of the refined product.

(8) GHG emissions associated with the combustion of refined products shall be assessed and normalized with respect to the volume of each refined product sold.

(9) The "carbon intensity" of each refined product is the sum of the combustion emissions (kg $CO_2$eq/bbl) and the "WTT" emissions (kg $CO_2$eq/bbl) relative to the energy value of the refined product during combustion. Following the convention of the EPA Renewable Fuel Standard 2, these emissions are expressed in terms of the low heating value (LHV) of the fuel, i.e. g $CO_2$eq/MJ refined product (LHV basis).

In the above methodology, the dominant contribution for the amount of $CO_2$ produced per MJ of refined product is the $CO_2$ formed during combustion of the product Because the $CO_2$ generated during combustion is such a high percentage of the total carbon intensity, achieving even small or incremental reductions in carbon intensity has traditionally been challenging. In various aspects, it has been discovered that kerosene fractions derived from selected crude oils can be used to form fuels with reduced carbon intensities. The selected crude, oils correspond to crude oils with high naphthenes to aromatics ratios, low sulfur content, and a low but substantial aromatics content. This combination of features can allow for formation of a kerosene fraction from the crude oil that requires a reduced or minimized amount of refinery processing in order to make a fuel product and/or fuel blending product.

In this discussion, a low carbon intensity fuel or filet blending product corresponds to a fuel or fuel blending product that has reduced GHG emissions per unit of lower of heating value relative to a fuel or fuel blending product derived from a conventional petroleum source. In some aspects, the reduced GHG emissions can be due in part to reduced refinery processing. For example, fractions that are not hydroprocessed for sulfur removal have reduced well-to-refinery emissions relative to fractions that require hydroprocessing prior to incorporation into a fuel. In various aspects, an unexpectedly high weight ratio of naphthenes to aromatics in a shale oil fraction can indicate a fraction with reduced GHG emissions, and therefore a lower carbon intensity.

For a conventionally produced jet fuel, a carbon intensity of 89 g $CO_2$eq/MJ refined product or more would be expected based on life cycle analysis. By reducing or minimizing refinery processing, such as by avoiding hydroprocessing, the carbon intensity for a fuel can be reduced by 1% to 10% relative to a conventional fuel. This can result in, for example, a jet fuel with a carbon intensity of 87.5 g $CO_2$eq/MJ refined product or less, or 87.0 g $CO_2$eq/MJ refined product or less, or 85.0 g $CO_2$eq/MJ refined product or less, such as down to 80 g $CO_2$eq/MJ refined product or possibly still lower.

Another indicator of a low carbon intensity fuel can be an elevated ratio of aliphatic sulfur to total sulfur in a fuel or fuel blending product. Aliphatic sulfur is generally easier to remove than other types of sulfur present in a hydrocarbon fraction. In a hydrotreated fraction, the aliphatic sulfur will typically be remove almost entirely, while other types of sulfur species will remain. The presence of increased aliphatic sulfur in a product can indicate a lack of hydroprocessing for the product.

Still another indicator of a low carbon intensity fuel can be an elevated ratio of basic nitrogen to total nitrogen in a fuel or fuel blending product. Basic nitrogen is typically easier to remove by hydrotreatment. The presence of an increased amount of basic nitrogen in a product can therefore indicate a lack of hydroprocessing for the product.

Yet other ways of reducing carbon intensity for a hydrocarbon fraction can be related to methods used for extraction of a crude oil. For example, carbon intensity for a fraction can be reduced by using solar power, hydroelectric power, or another renewable energy source as the power source for equipment involved in the extraction process, either during drilling and well completion and/or during production of crude oil. As another example, extracting crude oil from an extraction site without using artificial lift can reduce the carbon intensity associated with a fuel.

As an example of the benefits of using lower carbon intensity methods for extraction, if crude oil is produced with an upstream GHG intensity of 10 kg $CO_2$eq/bbl, has 3.0 wt % sulfur or less, and an API gravity of 40 or more, then a substantial majority of the time, a kerosene fraction (or jet fraction) refined from such a crude oil can have a "well to wheel" or "well to wake" (for use in aviation) GHG intensity that is 10% lower than the conventional value of 89 g $CO_2$eq/MJ refined product or more.

As another example, if crude oil is produced with an upstream GHG intensity of 10 kg $CO_2$eq/bbl, has 3.0 wt % sulfur or less, and an API gravity of 30 or more, then a majority of the time, a kerosene fraction (or jet fraction) refined from such a crude oil can have a "well to wheel" or "well to wake" (for use in aviation) GHG intensity Otherwise known as "carbon intensity") that is 10% lower than the conventional value of 89 g $CO_2$eq/MJ refined product or more.

As still another example, if crude oil is produced with an upstream GHG intensity of 30 kg $CO_2$eq/bbl, has 3.0 wt % sulfur or less, and an API gravity of 40 or more, then in some instances, a kerosene fraction (or jet fraction) refined from such a crude oil can have a "well to wheel" or "well to wake" (for use in aviation) GHG intensity (otherwise known as "carbon intensity") that is 10% lower than the conventional value of 89 g $CO_2$eq/MJ refined product or more.

As yet another example, if crude oil is produced with an upstream GHG intensity of 20 kg $CO_2$eq/bbl, has 3.0 wt % sulfur or less, and an API gravity of 40 or more, then a substantial majority of the time, a kerosene fraction (or jet fraction) refined from such a crude oil can have a "well to wheel" or "well to wake" (for use in aviation) GHG intensity (otherwise known as "carbon intensity") that is 10% lower than the conventional value of 89 g $CO_2$eq/MJ refined product or more.

Optional Treatment of Kerosene and/or Jet Fractions

In various aspects, a kerosene fraction at least in part by distilling a kerosene boiling, range fraction from a selected whole crude or partial crude that has an unexpected combination of a high naphthenes to aromatics ratio, a low but substantial aromatics content, and a low sulfur content. In some aspects, the kerosene fraction can be used as a fuel or fuel blending component with reduced, minimized, or substantially no additional processing. In other aspects, it may be desirable to further treat the kerosene fraction. Examples of further treatment methods can include, but are not limited to, wet treating, clay treatment, acid and/or caustic treatment, mercaptan oxidation, salt drying, and hydroprocessing.

Clay treatment, or more generally exposure of a jet fuel sample to an adsorbent, is an example of a method that can be used to remove a variety of types of impurities from a sample. Suitable adsorbents can include, but are not limited to, natural and/or synthetic clays. Fuller's earth, attapulgite, and silica gels. Such adsorbents are commercially available in various particle sizes and surface areas. It is noted that the effectiveness of an adsorbent for reducing the content of an impurity (such as nitrogen or nitrogen compounds) in a sample can be dependent on the affinity of the adsorbent for a given compound and/or the prior usage history of the adsorbent. For example, exposing a kerosene boiling range fraction to a clay adsorbent that is loaded with basic nitrogen compounds (such as due to prior adsorption from other kerosene boiling range samples) may result in exchange of nitrogen compounds from the current kerosene boiling range sample for previously adsorbed nitrogen compounds. Similar adsorption/desorption type processes may also occur for other polar compounds that have previously been absorbed by the absorbent.

The conditions employed during clay treatment (or other adsorbent treatment) can vary over a broad range. Treatment with adsorbent can generally be carried out in a temperature mime of 0°-100° C. and preferably near ambient conditions, such as 20°-40° C., for a period of time generally ranging from about 1 second to 1 hour. The jet fuel sample can be exposed to the adsorbent in a packed column at any convenient pressure.

Another alternative for removal of basic compounds from a kerosene or jet fuel fraction is acid washing. During acid washing, a feed corresponding to a kerosene or jet fuel sample can be mixed with an aqueous acid solution. Acid can be injected into the feed, for example, at a rate of 6-10 barrels of acid to every thousand barrels of jet fuel. The acid/feed mixture can then pass through a mixing valve, which maintains a mixing differential pressure on the feed of 5-2 psig (35-175 kPag) to sufficiently contact the acid with the sulfur and nitrogen compounds within the jet fuel. The acid/feed mixture can then be routed into the acid coalescer drum. In the coalescer, the acid can be separated from the jet fuel feed using an electrical field that accelerates the rate of separation. The acid settles to the bottom of the drum and can be drawn off on level control. After leaving the coalescer, the acid can be disposed of in any convenient manner, such as sending the acid to offsite storage for resale. It is noted that the sulfuric acid and many types of typical jet fuel feeds are essentially immiscible, so that only minimal amounts of emulsion are typically formed in the acid coalescer. An example of a suitable acid can be a sulfuric acid mixture at a concentration of 80-95 wt %. The remainder of the acid mixture that is not sulfuric acid can be mostly water. Optionally, other components can also be present in the mixture, such as acid soluble oils that may be present if the sulfuric acid corresponds to spent sulfuric acid from another refinery process.

Still another option for upgrading a jet fuel fraction is to hydroprocess the jet fuel fraction, A wide range of hydroprocessing conditions are potentially suitable for use, as even mild hydroprocessing conditions may produce a benefit in the properties of the jet fuel fraction. Hydroprocessing of a kerosene fraction can be used to remove sulfur, remove nitrogen, saturate olefins, saturate aromatics, and/or for other purposes, During hydroprocessing, a feedstock that is partially or entirely composed of a jet fuel boiling range fraction is treated in a hydrotreatment (or other hydroprocessing) reactor that includes one or more hydrotreatment stages or beds. Optionally, the reaction conditions in the hydrotreatment stage(s) can be conditions suitable for reducing the sulfur content of the feedstream, such as conditions suitable for reducing the sulfur content of the feedstream to about 3000 wppm or less, or about 1000 wppm or less, or about 500 wppm or less. The reaction conditions can include an LHSV of 0.1 to 20.0 hr$^{-1}$, a hydrogen partial pressure from about 50 psig, (0.34 MPag) to about 3000 psig (20.7 MPag), a treat gas containing at least about 50% hydrogen, and a temperature of from about 450° F. (232° C.) to about 800° F. (427° C.). Preferably, the reaction conditions include an LHSV of from about 0.3 to about 5 hr$^{-1}$, a hydrogen partial pressure from about 100 psig (0.69 MPag) to about 1000 psig (6.9 MPag), and a temperature of from about 700° F. (371° C.) to about 750° F. (399° C.).

Optionally, a hydrotreatment reactor can be used that operates at a relatively low total pressure values, such as total pressures of about 200 psig (1.4 MPag) to about 800 psig (5.5 MPag). For example, the pressure in a stage in the hydrotreatment reactor can be at least about 200 psig (1.4 MPag), or at least about 300 psig (2.1 MPag), or at least about 400 psig (2.8 MPag), or at least about 450 psig (3.1 MPag). The pressure in a stage in the hydrotreatment reactor can be about 800 psig (5.5 MPag) or less, or about 700 psig (4_8 MPag) or less, or about 600 psig (4.1 MPa) or less.

The catalyst in a hydrotreatment stage can be a conventional hydrotreating catalyst, such as a catalyst composed of a Group VIB metal and/or a Group VIII metal on a support. Suitable metals include cobalt, nickel, molybdenum, tungsten, or combinations thereof. Preferred combinations of metals include nickel and molybdenum or nickel, cobalt, and molybdenum. Suitable supports include silica, silica-alumina, alumina, and titania.

In an embodiment, the amount of treat gas delivered to the hydrotreatment stage can be based on the consumption of hydrogen in the stage. The treat gas rate for a hydrotreatment stage can be from about two to about five times the amount of hydrogen consumed per barrel of fresh feed in the stage. A typical hydrotreatment stage can consume from about 50 SCF/B (8.4 m$^3$/m$^3$) to about 1000 SCF/B (168.5 m$^3$/m$^3$) of hydrogen, depending on various factors including the nature of the feed being hydrotreated. Thus, the treat gas rate can be from about 100 SCF/13 (16.9 m$^3$/m$^3$) to about 5000 SCF/B (842 m$^3$/m$^3$). Preferably, the treat gas rate can be from about four to about five time the amount of hydrogen consumed. Note that the above treat gas rates refer to the rate of hydrogen flow. If hydrogen is delivered as pan of a gas stream having less than 100% hydrogen, the treat gas rate for the overall gas stream can be proportionally higher.

Yet another option can be to use a mercaptan oxidation treatment. Mercaptan oxidation involves exposing a sulfur-containing hydrocarbon fraction to an aqueous alkaline solution. In the alkaline environment, mercaptans in the hydrocarbon fraction can be converted into mercaptan salts, which are water soluble. The water soluble mercaptan salts stay with the water phase when the hydrocarbon fraction is separated from the alkaline aqueous solution. The mercaptan salts can then be converted to disulfides to facilitate separation of the sulfur compounds from the alkaline aqueous solution.

Characterization of Shale Crude Oils and Shale Oil Fractions General

Shale crude oils were obtained from a plurality of different shale oil extraction sources. Assays were performed on the shale crude oils to determine various compositional characteristics and properties for the shale crude oils. The shale crude oils were also fractionated to form various types of fractions, including fractionation into atmospheric resid fractions, vacuum resid fractions, distillate fractions (including kerosene, diesel, and vacuum gas oil boiling range fractions), and naphtha fractions. Various types of characterization and/or assays were also performed on these additional fractions.

The characterization of the shale crude oils and/or crude oil fractions included a variety of procedures that were used to generate data. For example, data for boiling ranges and fractional distillation points was generated using methods similar to compositional or pseudo compositional analysis such as ASTM D2887. For compositional features, such as the amounts of paraffins, isoparaffins, olefins, naphthenes, and/or aromatics in a crude oil and/or crude oil fraction, data was generated using methods similar to compositional analysis such as ASTM D5186 and/or other gas chromatography techniques. Data related to pour point was generated using methods similar to ASTM 397 and/or ASTM D5949. Data related to cloud point was generated using methods similar to ASTM D2500 and/or ASTM D5773. Data related to sulfur content of a crude oil and/or crude oil fraction was generated using methods similar to ASTM D2622, ASTM D4294, and/or ASTM D5443. Data related to density (such as density at 15° C.) was generated using methods similar to ASTM D1298 and/or ASTM D4052. Data related to kinematic viscosity (such as kinematic viscosity at 40° C.) was generated using methods similar to ASTM D445 and/or ASTM D7042.

The data and other measured values for the shale crude oils and shale oil fractions were then incorporated into an existing data library of other representative conventional and non-conventional crude oils for use in an empirical model. The empirical model was used to provide predictions for compositional characteristics and properties for some additional shale oil fractions that were not directly characterized experimentally. In this discussion, data values provided by this empirical model will be described as modeled data. In this discussion, data values that are not otherwise labeled as modeled data correspond to measured values and/or values that can be it) directly derived from measured values. An example of such an empirical model is AVEVA Spiral Suite 2019.3 Assay by Air EVA Solutions Limited.

Figure 2:
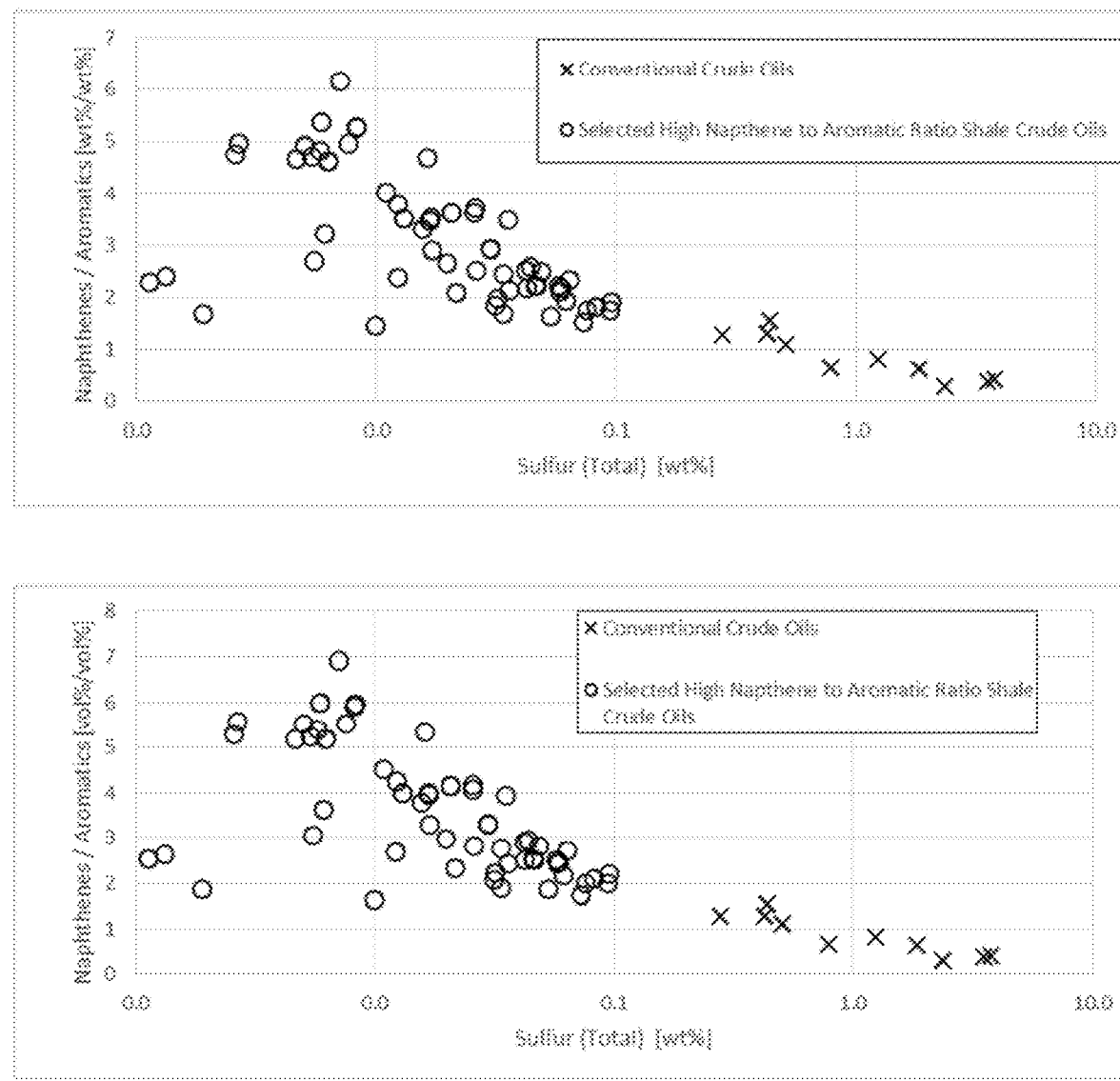
FIG. 2 shows compositional information for various crude oils.

FIGS. 1 and 2 show examples of the unexpected combinations of properties for shale crude oils that have a high weight ratio and/or volume ratio of naphthenes to aromatics. In FIG. 1, both the weight ratio and the volume ratio of naphthenes to aromatics is shown for five shale crude oils relative to the weight/volume percentage of paraffins in the shale crude oil. The top plot in FIG. 1 shows the weight ratio of naphthenes to aromatics, while the bottom plot shows the volume ratio. A plurality of other representative conventional crudes are also shown in FIG. 1 for comparison. As shown in FIG. 1, the selected shale crude oils described herein have a paraffin content of greater than 40 wt % while also having a weight ratio of naphthenes to aromatics of 1.8 or more. Similarly, as shown in FIG. 1, the selected shale crude oils described herein have a paraffin content of greater than 40 vol % while also having a weight ratio of naphthenes to aromatics of 2.0 or more. By contrast, none of the conventional crude oils shown in FIG. 1 have a similar combination of as paraffin content of greater than 40 wt % and a weight ratio of naphthenes to aromatics of 1.8 or more, or a combination of paraffin content of greater than 40 vol % and a weight ratio of naphthenes to aromatics of 2.0 or more. It has been discovered that this unexpected combination of naphthenes to aromatics ratio and paraffin content is present throughout various fractions that can be derived from such selected crude oils.

In FIG. 2, both the volume ratio and weight ratio of naphthenes to aromatics is shown for the five shale crude oils in FIG. 1 relative to the weight of sulfur in the crude. The sulfur content of the crude in FIG. 2 is plotted on a logarithmic scale. The top plot in FIG. 2 shows the weight ratio of naphthenes to aromatics, while the bottom plot shows the volume ratio. The plurality of other representative conventional crude oils are also shown for comparison. As shown in FIG. 2, the selected shale crude oils have naphthene to aromatic volume ratios of 2.0 or more, while all of the conventional crude oils have naphthene to aromatic volume ratios below 1.8. Similarly, as shown in FIG. 2, the selected shale crude oils have naphthene to aromatic weight ratios of 1.8 or more, while all of the conventional crude oils have naphthene to aromatic weight ratios below 1.6 Additionally, the selected shale crude oils have a sulfur content of roughly 0.1 wt % or less, while all of die conventional crude oils shown in FIG. 2 have a sulfur content of greater than 0.2 wt %. It has been discovered that this unexpected combination of high naphthene to aromatics ratio and low sulfur is present within various fractions that can be derived from such selected crude oils. This unexpected combination of properties contributes to the ability to produce low carbon intensity fuels from shale oil fractions and/or blends of shale oil fractions derived from the shale crude oils.

Characterization of Shale Oil Fractions—Kerosene Boiling Range Fraction

In various aspects, a kerosene boiling range fraction as described herein can be used as a fuel fraction, such as a jet fuel fraction. The combination of low sulfur, high naphthenes to aromatics ratio, and low but substantial aromatics content can allow a kerosene fraction to be used as a fuel fraction with a reduced or minimized amount of refinery processing.

FIG. 3 shows measured values for kerosene fractions derived from nine different shale crude oils and/or crude oil blends. It is noted that the T90 distillation points for the fractions shown in FIG. 3 is between 280° C. and 290° C. In aspects where a kerosene fraction is used to form a jet fuel fraction, a final boiling point between 280° C. and 300° C., or between 280° C. and 290° C., can be beneficial. It is believed that the compositional properties shown in FIG. 3 are representative of a fraction with a final boiling point between 280° C. and 300° C. As shown in FIG. 3, the kerosene fractions had a naphthenes content between 38 wt % to 52 wt %, or 39 wt % to 51 wt %. The kerosene fractions also had an aromatics content between 4.0 wt % to 27 wt %, or 4.0 wt % to 18 wt %, or 4.0 wt % to 16 wt %, or 4.0 wt % to 12 wt %, or 4.0 wt % to 10 wt %. The weight ratio of naphthenes to aromatics ranged from 1.5 to 10. Some of the kerosene fractions had an unexpected combination of high naphthenes to aromatics weight ratio and a low but substantial content of aromatics. For such fractions, the aromatics content was 4.0 wt % to 18 wt %, or 4.0 wt % to 16 wt %, or 4.0 wt % to 12 wt %, or 4.0 wt % to 10 wt %. For such fractions, the naphthenes to aromatics ratio was 3.2 to 10, or 4.0 to 10, or 5.0 to 10, or 6.0 to 10.

In addition to the naphthenes and aromatics contents, the kerosene fractions shown in FIG. 3 had a density at 15° C. between 0.775 and 0.84 OM, or between 0.78 and g/ml, or between 0.79 g/ml and 0.82 g/ml; a pour point between −40° C. and −50° C., or −40° C. to −48° C.; a cloud point between −32° C. and −42° C., or −32° C. to −40° C. and a freeze point between −30° C. and −45° C., or between −35° C. to −45° C. The fractions had a T10 distillation point of 205° C. or less, or 201° C. or less. With regard to properties, it is believed that fractionating a selected crude oil to achieve a, final boiling point between 280° C. and 300° C. (instead of having a TOO distillation point between 280° C. and 290° C.) would result in lower temperature values for cold flow properties such as pour point, cloud point, and freeze point. Thus, it is believed that for a fraction with a final boiling point between and 300° C., the cloud point would be −40° C. or lower, and the freeze point would be −40° C. or lower.

As a comparison for the data in FIG. 3, an article titled "Impact of Light Tight Oils on. Distillate Hydrotreater Operation" in the May 2016 issue of Petroleum Technology Quarterly included a listing; of paraffin and aromatics contents for shale oils from a variety of shale oil formations. Comparative Table 1 shows the data provided from that article. Comparative Table 1 also includes a column for a representative kerosene fraction derived from West Texas Intermediate, a conventional light sweet crude oil. It is noted that the representative sulfur content reported in the article for WTI was greater than 1000 wppm.

In Comparative Table 1, the kerosene fractions correspond to fractions having a boiling range of: 50° F.-500° F.' (177° C. to 260° C.). The values for paraffins and aromatics correspond to wt % as reported in the article. The naphthenes value is a maximum potential value calculated based on the reported paraffins and aromatics values. (The actual naphthenes value could be lower due to the presence of polar compounds.) This naphthenes weight percent was then used to calculate the naphthenes to aromatics ratio shown in the final row of the table.

COMPARATIVE TABLE 1

Comparative Kerosene Fractions

|  | WTI | Bakken | Eagle Ford | Bach Ho | Cossack | Gippsland | Kutubu | Qua Iboe |
|---|---|---|---|---|---|---|---|---|
| Paraffins | 42 | 35 | 45 | 54 | 43 | 47 | 36 | 30 |
| Aromatics | 14 | 16 | 13 | 12 | 17 | 20 | 21 | 17 |
| Naphthenes (calculated, maximum potential) | 44 | 49 | 42 | 34 | 40 | 33 | 43 | 53 |
| Naphthenes to Aromatics ratio | 3.1 | 3.0 | 3.2 | 2.8 | 2.4 | 1.7 | 2.0 | 3.1 |

As shown in Comparative Table 1, the highest naphthenes to aromatics ratio is 3.2. All but one of the fractions in Comparative Table 1 had an aromatics content of 13 wt % or more, while the remaining fraction had an aromatics content of 12 wt % but a naphthenes to aromatics weight ratio of less than 3.0.

Additional Embodiments

Embodiment 1. A kerosene boiling range composition comprising a T10 distillation point of 205° C. or less, a final boiling point of 300° C. or less, a naphthenes to aromatics weight ratio of 3.2 or more, an aromatics content of 4.0 wt % to 18 wt %, and a sulfur content of 150 wppm or less.

Embodiment 2. A kerosene boiling range product comprising: 1.0 wt % to 49 wt % of sustainable aviation fuel in accordance with ASTM D7566; and 51 wt % to 99 wt % of a kerosene boiling range composition, the kerosene boiling range composition comprising a T10 distillation point of 205° C. or less, a final boiling point of 300° C. or less, a naphthenes to aromatics weight ratio of 3.2 or more, an aromatics content of 4.0 wt % to 18 wt %, and a sulfur content of 100 wppm or less.

Embodiment 3. The kerosene boiling range composition or kerosene boiling range product of any of the above embodiments, wherein the kerosene boiling range composition comprises an aromatics content of 4.0 wt % to 12 wt %, or 4.0 wt % to 10 wt %.

Embodiment 4. The kerosene boiling range composition or kerosene boiling range product of any of the above embodiments, wherein the kerosene boiling range composition comprises a naphthenes to aromatics weight ratio of 4.0 or more, or wherein the kerosene boiling range composition comprises a cetane index of 31 to 55, or a combination thereof.

Embodiment 5. The kerosene boiling range composition or kerosene boiling range product of any of the above embodiments, wherein the kerosene boiling range composition comprises a fuel that satisfies the specifications for a jet fuel in accordance with ASTM D1655.

Embodiment 6, The kerosene boiling range composition or kerosene boiling range product of any of the above embodiments, wherein the kerosene boiling range composition comprises a pour point of −40° C. or lower, or wherein the kerosene boiling range composition comprises a cloud point of −40° C. or lower, wherein the kerosene boiling range composition comprises a freeze point of −40° C. or lower, or a combination thereof.

Embodiment 7. The kerosene boiling range composition or kerosene boiling range product of any of the above embodiments, wherein the kerosene boiling range composition comprises a weight ratio of aliphatic sulfur to total sulfur of 0.05 or more, or wherein the kerosene boiling range composition comprises a weight ratio of n-paraffins to total paraffins of 0.4 or more, or a combination thereof.

Embodiment 8. Use of a composition comprising the kerosene boiling range composition according to any of the above embodiments as a fuel in an engine, a furnace, a harrier, a combustion device, or a combination thereof.

Embodiment 9. Use of the composition of Embodiment 8, wherein the kerosene boiling range composition has not been exposed to hvdroprocessing conditions, or wherein the distillate boiling range composition comprises a carbon intensity of 87 g C0.2eq/MJ of lower heating value or less, or a combination thereof.

Embodiment 10. A method for forming a kerosene boiling range composition, comprising: fractionating a crude oil comprising a final boiling point of 550° C. or more to form at least a kerosene boiling range fraction, the crude oil comprising a naphthenes to aromatics volume ratio of 2.0 or more and a sulfur content of 0.2 or less, the kerosene boiling range composition comprising a TI 0 distillation point of 205° C. or less, a final boiling point of 300° C. or less, a naphthenes to aromatics weight ratio of 3.2 or more, an aromatics content of 4.0 wt % to wt %, and a sulfur content of 100 wppm or less.

Embodiment 11. The method of Embodiment 10, wherein the crude oil comprises a paraffins content of 40 vol % or more.

Embodiment 12. The method of Embodiment 10 or 11, wherein the kerosene boiling range fraction comprises an aromatics content of 4.0 wt % to 12 or Wherein the kerosene boiling range fraction comprises a naphthenes to aromatics weight ratio of 4.0 or more, or a combination thereof.

Embodiment 13. The method of any of Embodiments 10 to 12, further comprising blending at least a portion of the kerosene boiling range fraction with a sustainable aviation fuel in accordance with ASTM D7566.

Embodiment 14. The method of any of Embodiments 10 to 13, wherein the kerosene boiling range composition comprises a non-hydrotreated composition that has not been exposed to more than 10 psia of hydrogen in the presence of a catalyst comprising a Group VI metal, a Group VIII metal, a catalyst comprising a zeolitic framework, or a combination thereof.

Embodiment 15. The method of any of Embodiments 10 to 14, further comprising exposing the kerosene boiling range fraction to clay treatment, acid treatment, mercaptan oxidation, or a combination thereof.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining, the true scope of the present invention.

What is claimed is:

1. A kerosene boiling range composition comprising a T10 distillation point of 205° C. or less, a final boiling point of 300° C. or less, a naphthenes to aromatics weight ratio of 3.2 or more, an aromatics content of 4.0 wt % to 18 wt %, and a sulfur content of 47 ppm or more and
wherein the kerosene boiling range composition has not been exposed to hydroprocessing conditions.

2. The kerosene boiling range composition of claim 1, wherein the kerosene boiling range composition comprises an aromatics content of 4.0 wt % to 12 wt %.

3. The kerosene boiling range composition of claim 1, wherein the kerosene boiling range composition comprises an aromatics content of 4.0 wt % to 10 wt %.

4. The kerosene boiling range composition of claim 1, wherein the kerosene boiling range composition comprises a naphthenes to aromatics weight ratio of 4.0 or more.

5. The kerosene boiling range composition of claim 1, wherein the kerosene boiling range composition comprises a cetane index of 31 to 55.

6. The kerosene boiling range composition of claim 1, wherein the kerosene boiling range composition comprises a fuel that satisfies the specifications for a jet fuel in accordance with ASTM D1655.

7. The kerosene boiling range composition of claim 1, wherein the kerosene boiling range composition comprises a pour point of −40° C. or lower, or wherein the kerosene boiling range composition comprises a cloud point of −40° C. or lower, wherein the kerosene boiling range composition comprises a freeze point of −40° C. or lower, or a combination thereof.

8. The kerosene boiling range composition of claim 1, wherein the kerosene boiling range composition comprises a weight ratio of aliphatic sulfur to total sulfur of 0.05 or more.

9. The kerosene boiling range composition of claim 1, wherein the kerosene boiling range composition comprises a weight ratio of n-paraffins to total paraffins of 0.4 or more.

10. The kerosene boiling range composition of claim 1, wherein the kerosene boiling range composition is used as a fuel in an engine, a furnace, a burner, a combustion device, or a combination thereof.

11. The kerosene boiling range composition of claim 1, wherein the kerosene boiling range composition comprises a carbon intensity of 87 g $CO_2$eq/MJ of lower heating value or less.

12. A kerosene boiling range product comprising:
1.0 wt % to 49 wt % of sustainable aviation fuel in accordance with ASTM D7566; and
51 wt % to 99 wt % of a kerosene boiling range composition, the kerosene boiling range composition comprising a T10 distillation point of 205° C. or less, a final boiling point of 300° C. or less, a naphthenes to aromatics weight ratio of 3.2 or more, an aromatics content of 4.0 wt % to 18 wt %, and a sulfur content of 47 ppm or more and
wherein the kerosene boiling range composition has not been exposed to hydroprocessing conditions.

13. A method for forming a kerosene boiling range composition, comprising:
fractionating a crude oil comprising a final boiling point of 550° C. or more to form at least a kerosene boiling range fraction, the crude oil comprising a naphthenes to aromatics volume ratio of 2.0 or more and a sulfur content of 0.2 wt % or less, the kerosene boiling range composition comprising a T10 distillation point of 205° C. or less, a final boiling point of 300° C. or less, a naphthenes to aromatics weight ratio of 3.2 or more, an aromatics content of 4.0 wt % to 18 wt %, and a sulfur content of 47 ppm or more and
wherein the kerosene boiling range composition has not been exposed to hydroprocessing conditions.

14. The method of claim 13, wherein the crude oil comprises a paraffins content of 40 vol % or more.

15. The method of claim 13, wherein the kerosene boiling range fraction comprises an aromatics content of 4.0 wt % to 12 wt %.

16. The method of claim 13, wherein the kerosene boiling range fraction comprises a naphthenes to aromatics weight ratio of 4.0 or more.

17. The method of claim 13, further comprising blending at least a portion of the kerosene boiling range fraction with a sustainable aviation fuel in accordance with ASTM D7566.

18. The method of claim 13, further comprising exposing the kerosene boiling range fraction to clay treatment, acid treatment, mercaptan oxidation, or a combination thereof.

* * * * *